(12) United States Patent
Ramanathan et al.

(10) Patent No.: US 12,224,968 B2
(45) Date of Patent: Feb. 11, 2025

(54) SYSTEMS AND METHODS FOR ANALYZING CHATBOT COMMUNICATION SESSIONS TO REDUCE ESCALATION

(71) Applicant: Verizon Patent and Licensing Inc., Basking Ridge, NJ (US)

(72) Inventors: Lakshmi Ramanathan, Chennai (IN); Johncy Arul Anburose, Tiruchirappalli (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 165 days.

(21) Appl. No.: 17/456,386

(22) Filed: Nov. 24, 2021

(65) Prior Publication Data
US 2023/0164095 A1    May 25, 2023

(51) Int. Cl.
| | |
|---|---|
| G06F 15/16 | (2006.01) |
| G06N 20/00 | (2019.01) |
| H04L 51/02 | (2022.01) |
| H04L 51/216 | (2022.01) |
| G06F 40/20 | (2020.01) |

(52) U.S. Cl.
CPC ............ *H04L 51/02* (2013.01); *G06N 20/00* (2019.01); *H04L 51/216* (2022.05); *G06F 40/20* (2020.01)

(58) Field of Classification Search
CPC ....... H04L 51/02; H04L 51/216; G06N 20/00; G06F 40/20
USPC ........................................................ 709/206
See application file for complete search history.

(56) References Cited

U.S. PATENT DOCUMENTS

| | | | |
|---|---|---|---|
| 2002/0091718 A1* | 7/2002 | Bohannon ........... | G06F 11/1474 |
| 2005/0213743 A1* | 9/2005 | Huet ..................... | G06Q 10/10 |
| | | | 379/265.09 |
| 2017/0300690 A1* | 10/2017 | Ladnai .................. | G06F 21/554 |
| 2017/0324867 A1* | 11/2017 | Tamblyn ............. | H04L 65/1093 |
| 2020/0059481 A1* | 2/2020 | Sekar .................. | H04L 63/1425 |
| 2021/0173760 A1* | 6/2021 | Downie ............. | G06F 11/3664 |
| 2022/0309250 A1* | 9/2022 | Das .......................... | G06N 3/08 |
| 2023/0108637 A1* | 4/2023 | Rabinovich ........... | G06F 16/355 |
| | | | 717/124 |

OTHER PUBLICATIONS

Nichol, "5 Levels of Conversational AI: 2020 Update," RASA, Conversational AI Blog, Jun. 17, 2020, 10 pages.

* cited by examiner

*Primary Examiner* — Imad Hussain

(57) ABSTRACT

A device may receive session data of a communication session between an artificial intelligence (AI) communication device and a first user device. The device may analyze the session data to determine one or more portions of the session data and may identify a portion, of the one or more portions, for processing based on one or more criteria associated with the portion. The portion may include a plurality of entries including communications from the first user device and from the AI communication device. The device may analyze the plurality of entries to identify an entry including information regarding an escalation and may analyze one or more additional entries, of the plurality of entries, to determine a category associated with a cause of the escalation. The device may cause the AI communication device to be configured to address the cause based on the one or more additional entries and the category.

20 Claims, 11 Drawing Sheets

155

Provide, to one or more devices, information regarding the one or more additional entries and information regarding the cause for the escalation for training of chatbot

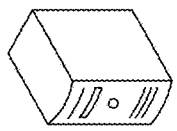

Communication Analysis Device 105

| CREATE_DATE_EST | SESSION_ID | REQUEST_MSG | RESPONSE_MSG | CHANNEL | CONV_NAME | NLP_VERSION | ESC_ROW | SEQUENCE | TRACK_POS | CATEGORY |
|---|---|---|---|---|---|---|---|---|---|---|
| 7/5/2021 13:13 | 0034308d4dbd | MENU | GREETING | MOBILEPKS | Default Welcome in V1 | V3 | | 0 | -7 | Discounts/Credits Not Found |
| 7/5/2021 13:15 | 0034308d4dbd | Why has my bill credits got taken a | We understand how | MOBILEPKS | Check Discount | V3 | | 1 | -6 | Discounts/Credits Not Found |
| 7/5/2021 13:15 | 0034308d4dbd | No...I should be getting the promoti | can definitely help | MOBILEPKS | Check Discount | V3 | | 2 | -5 | Discounts/Credits Not Found |
| 7/5/2021 13:15 | 0034308d4dbd | This is suppose to be on every photo | "How many questions" | MOBILEPKS | Domain Pullback | V2 | | 3 | -4 | Discounts/Credits Not Found |
| 7/5/2021 13:17 | 0034308d4dbd | Representative | agent not available | MOBILEPKS | LIVECHAT | V2 | | 4 | -3 | Discounts/Credits Not Found |
| 7/5/2021 13:18 | 0034308d4dbd | MENU | GREETING | MOBILEPKS | Default Welcome in V1 | V3 | | 5 | -2 | Discounts/Credits Not Found |
| 7/5/2021 13:19 | 0034308d4dbd | Managing my account or bill | I understand that you | MOBILEPKS | View Bill | V3 | | 6 | -1 | Discounts/Credits Not Found |
| 7/5/2021 13:19 | 0034308d4dbd | am not getting my credits and discounts | "Bill credit | MOBILEPKS | AMB_Bill_Credit | V2 | Yes | 7 | 0 | Discounts/Credits Not Found |
| 7/5/2021 13:20 | 0034308d4dbd | chat with an agent | Let me connect you w | MOBILEPKS | LIVECHAT | V3 | | 8 | 1 | Discounts/Credits Not Found |

FIG. 1G

SYSTEMS AND METHODS FOR ANALYZING CHATBOT COMMUNICATION SESSIONS TO REDUCE ESCALATION

BACKGROUND

A chatbot may be utilized to attempt to reduce calls to a call support center. The chatbot may receive questions from a user via a web site (e.g., regarding a product or a service) and may provide answers to the questions.

BRIEF DESCRIPTION OF THE DRAWINGS

FIGS. 1A-1G are diagrams of an example associated with analyzing session data, of chatbot communication sessions, to reduce escalation.

DETAILED DESCRIPTION OF PREFERRED EMBODIMENTS

Figure 1A:
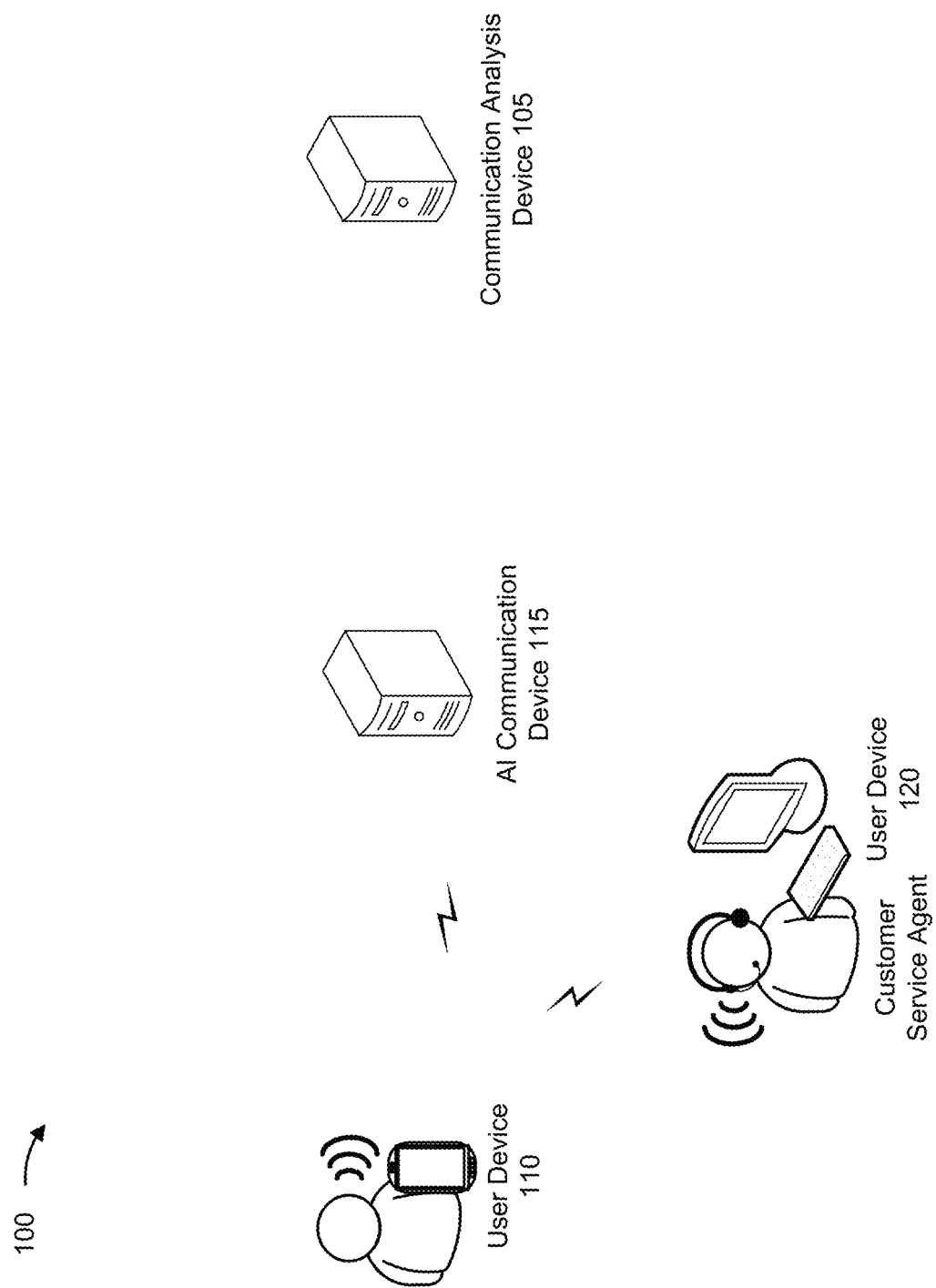

The following detailed description of example implementations refers to the accompanying drawings. The same reference numbers in different drawings may identify the same or similar elements.

A chatbot may handle thousands or millions of inquiries from numerous user devices per day. In this regard, the chatbot may be involved in thousands of communication sessions per day. During the communication sessions, the chatbot may provide responses to the inquiries. In some instances, during the communication sessions, the chatbot may be unable to provide a response to an inquiry from a user device or may provide a response that is not satisfactory to a user of the user device. Accordingly, an escalation may occur and, as part of the escalation, the user device may be connected to a device of a customer service representative (instead of being connected to the chatbot). The escalation may refer to an instance in which the user device is connected to the device of the customer service representative as a result of the inability of the chatbot to provide a response that is satisfactory to the user of the user device.

Information regarding the communication sessions may be generated and may include information regarding escalations that occurred during the communications. In some instances, the information regarding the communication sessions may be manually processed, using computing devices, to determine causes of the escalations. Manually processing the information regarding the communication sessions wastes computing resources, storage resources, network resources, among other examples. Additionally, manually processing the information regarding the communication sessions is subject to human errors. Accordingly, results (of processing the communication sessions) may be inaccurate. Utilization of the results, during subsequent communication sessions, may cause the chatbot to operate improperly. Accordingly, utilizing the results may waste computing resources, storage resources, network resources, and other resources that are used to troubleshoot the chatbot, to re-configure the chatbot, and/or to take other remedial actions with respect to the chatbot operating improperly.

Implementations described herein are directed to a device that analyzes session data of a communication session (between a chatbot and a user device) to determine information regarding a cause of an escalation during the communication session. For example, the device may analyze the session data (e.g., a transcript of the communication session) to identify different portions of the session data. In some situations, each portion may include one or more entries (e.g., rows). An entry may include a message from the user device and/or a message from the chatbot (e.g., a request message and/or a response message).

The device may determine a topic to be analyzed and may identify a portion, of the different portions, for processing based on determining that the portion is associated with the topic. The device may analyze the one or more entries, included in the portion, to identify a first entry that includes information indicating that the escalation has occurred. The device may analyze one or more additional entries in a reverse chronological order starting from the first entry to determine a cause of the escalation. The device may analyze the one or more additional entries in this manner because the cause of the escalation is typically included in an entry that chronologically precedes an entry that includes information indicating that the escalation has occurred.

Based on analyzing the one or more additional entries, the device may identify a second entry, from the one or more additional entries, that includes information indicating the cause of the escalation. The device may provide information regarding the second entry and information regarding the cause to one or more devices to train the chatbot to address the cause of the escalation and prevent subsequent escalations associated with the cause.

Determining the information regarding the cause of the escalation and providing the information regarding the second entry and the information regarding the cause may preserve computing resources, storage resources, and/or network resources that would have been used to manually process the session data to determine the cause of the escalation. Additionally, determining the information regarding the cause of the escalation and providing the information regarding the second entry and the information regarding the cause may preserve computing resources, storage resources, network resources that would have been used to take remedial actions with respect to errors in the results of manually processing the session data.

FIGS. 1A-1G are diagrams of an example 100 associated with analyzing session data, of chatbot communication sessions, to reduce escalation. As shown in FIGS. 1A-1G, example 100 includes a communication analysis device 105, a user device 110 (e.g., associated with a customer), an artificial intelligence (AI) communication device 115, and a user device 120 (e.g., associated with a customer service representative).

Communication analysis device 105 may include one or more devices capable of receiving, generating, storing, processing, and/or providing information associated with analyzing session data (of communication sessions) to reduce escalation, as described elsewhere herein. As an example, communication analysis device 105 may analyze the session data to determine a cause of the escalation and provide information regarding the cause to train the chatbot to address the cause and prevent another escalation, associated with the cause, during subsequent communication sessions involving the chatbot and/or another chatbot.

In some implementations, communication analysis device 105 may identify an entry, included in the session data, based on one or more rules stored in a rules data structure (e.g., a database, a table, and/or a linked list). The entry may be an entry that includes information regarding a cause of an escalation. The rules data structure may be stored in one or more memories associated with communication analysis device 105. The one or more rules may be used to identify information regarding causes of escalations. In some examples, the one or more rules may be generated based on processing historical session data of historical communication sessions to determine historical causes of escalations. In some situations, the historical session data may be processed manually using one or more computing devices.

User device 110 may include one or more devices capable of receiving, generating, storing, processing, and/or providing information associated with analyzing session data (of communication sessions) to reduce escalation, as described elsewhere herein. For example, user device 110 may provide messages (e.g., request messages) to AI communication device 115 during a communication session.

AI communication device 115 may include one or more devices capable of receiving, generating, storing, processing, and/or providing information associated with analyzing session data (of communication sessions) to reduce escalation, as described elsewhere herein. For example, AI communication device 115 may provide messages (e.g., response messages) to user device 110 during the communication sessions. AI communication device 115 may execute a chatbot, a voicebot, another type of virtual assistant, among other examples. User device 120 may be similar to user device 110.

In the example that follows, user device 110 may initiate a communication session with AI communication device 115. As a result of initiating the communication session, user device 110 may be connected with AI communication device 115 and may exchange messages with the chatbot. During the communication session, the AI communication device 115 may not respond to the user in a way that addresses the user's actual concern, and as a result the user may request an escalation. As part of the escalation, user device 110 may be disconnected from AI communication device 115 and may be connected to user device 120. Session data, of the communication session, may be generated and provided to communication analysis device 105 on a periodic basis for analysis to determine a cause of the escalation. For example, the session data may be generated by AI communication device 115 during the communication session between user device 110 and the chatbot. While the example may be described with respect to the communication session with the chatbot, implementations herein may be applicable to a communication session with a voicebot, a communication session with another virtual assistant, among other examples.

Figure 1B:
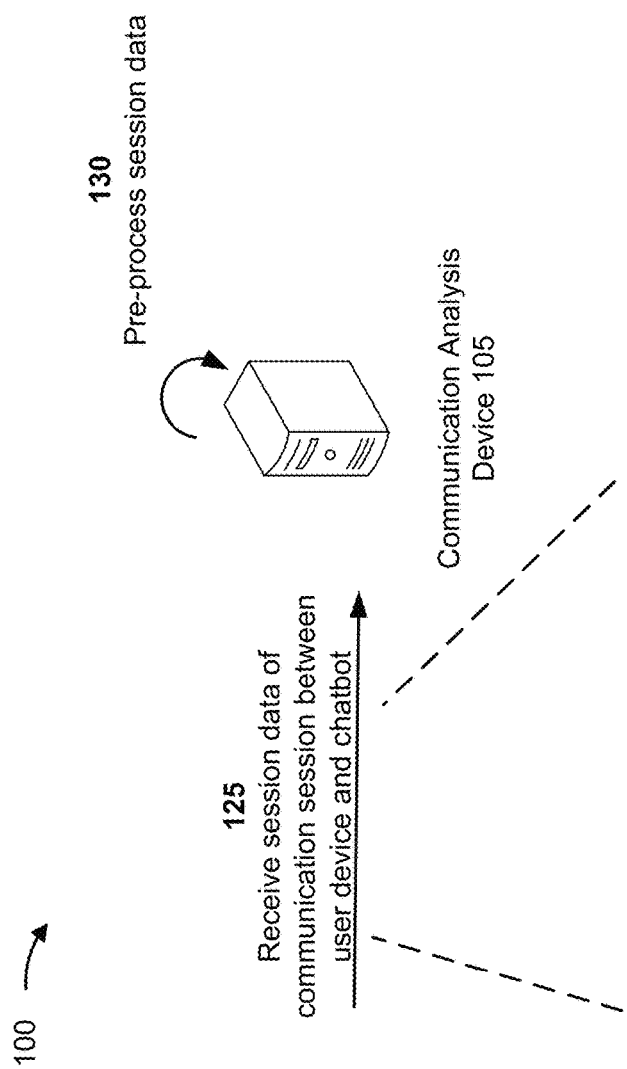

As shown in FIG. 1B, and by reference number 125, communication analysis device 105 may receive the session data of the communication session between user device 110 and the chatbot. For example, after the escalation has occurred, communication analysis device 105 may receive the communication data. For instance, communication analysis device 105 may receive the session data from AI communication device 115, from user device 120, from another device that generates transcripts of communication sessions, among other examples. In some implementations, communication analysis device 105 may receive the session data as part of an escalation analysis request to determine the cause of the escalation. In some implementations, when receiving the session data, communication analysis device 105 may receive a transcript of the communication session.

In some implementations, the session data may include a data structure that includes multiple entries (e.g., multiple rows). As shown in FIG. 1B, an entry may include information identifying date and/or time associated with the entry, information identifying the communication session, at least one of a communication from user device 110 or a communication from the chatbot, information identifying a communication channel used during the communication session, information identifying a topic of conversation associated with the entry, information identifying a version of a natural language processing (NLP) technique used to process the entry, among other examples.

The communication from user device 110 may include a request message. The request message may include a request for information. The communication from the chatbot may include a response message that includes a response to the request message. In some instances, the communication from user device 110 may be based on information provided by the chatbot to user device 110. For example, the chatbot may provide information (e.g., via a graphical user interface) that includes graphical user interface elements that may be selected by user device 110 to generate the communication. The graphical user interface may include a widget and the graphical user interface elements may include buttons.

In some implementations, the communications (e.g., messages from user device 110 and the chatbot) may be provided in a JavaScript Object Notation (JSON) format and the session data may be provided in an excel format, as an example. The formats mentioned herein are merely provided as examples. In practice, different quantities types of format may be used in different situations. The information identifying the communication channel may include information identifying a mobile device application, information identifying a web application, information identifying a messaging service (e.g., Short Message Service), among other examples.

In some examples, communication analysis device 105 may receive the session data from AI communication device 115 (e.g., based on the escalation occurring during the communication). Additionally, or alternatively, communication analysis device 105 may receive the session data from user device 120. For example, AI communication device 115 may provide the session data to user device 120 when user device 110 is connected to user device 120 (e.g., to provide the customer service representative some context regarding the communication session). User device 120 may provide the session data during or after a communication session between user device 120 and user device 110.

Additionally, or alternatively, to communication analysis device 105 receiving the session data from user device 120, communication analysis device 105 may receive the session data from a device of a customer representative center (e.g., a call support center) associated with user device 120. For example, AI communication device 115 may provide the session data to the device and the device may provide the session data to communication analysis device 105.

As shown in FIG. 1B, and by reference number 130, communication analysis device 105 may pre-process the session data. For example, communication analysis device 105 may perform data processing to remove information that does not provide insight with respect to determining the cause of the escalation. For example, communication analysis device 105 may remove one or more characters during pre-processing, such as special characters (e.g., "#," "*," "~,"), superfluous characters (e.g., "zzzz," "jjjj,", among other examples), return characters, superfluous space characters, among other examples.

Furthermore, communication analysis device 105 may remove or obfuscate sensitive information of the customer, such as credit card information, personal identification number (PIN), name, among other examples. Additionally, communication analysis device 105 perform the data processing to identify one or more of a beginning of the communication session, an ending of the communication session, dates and/or times when user device 110 provided communications, dates and/or times when the chatbot provided communications, among other examples.

Figure 1C:
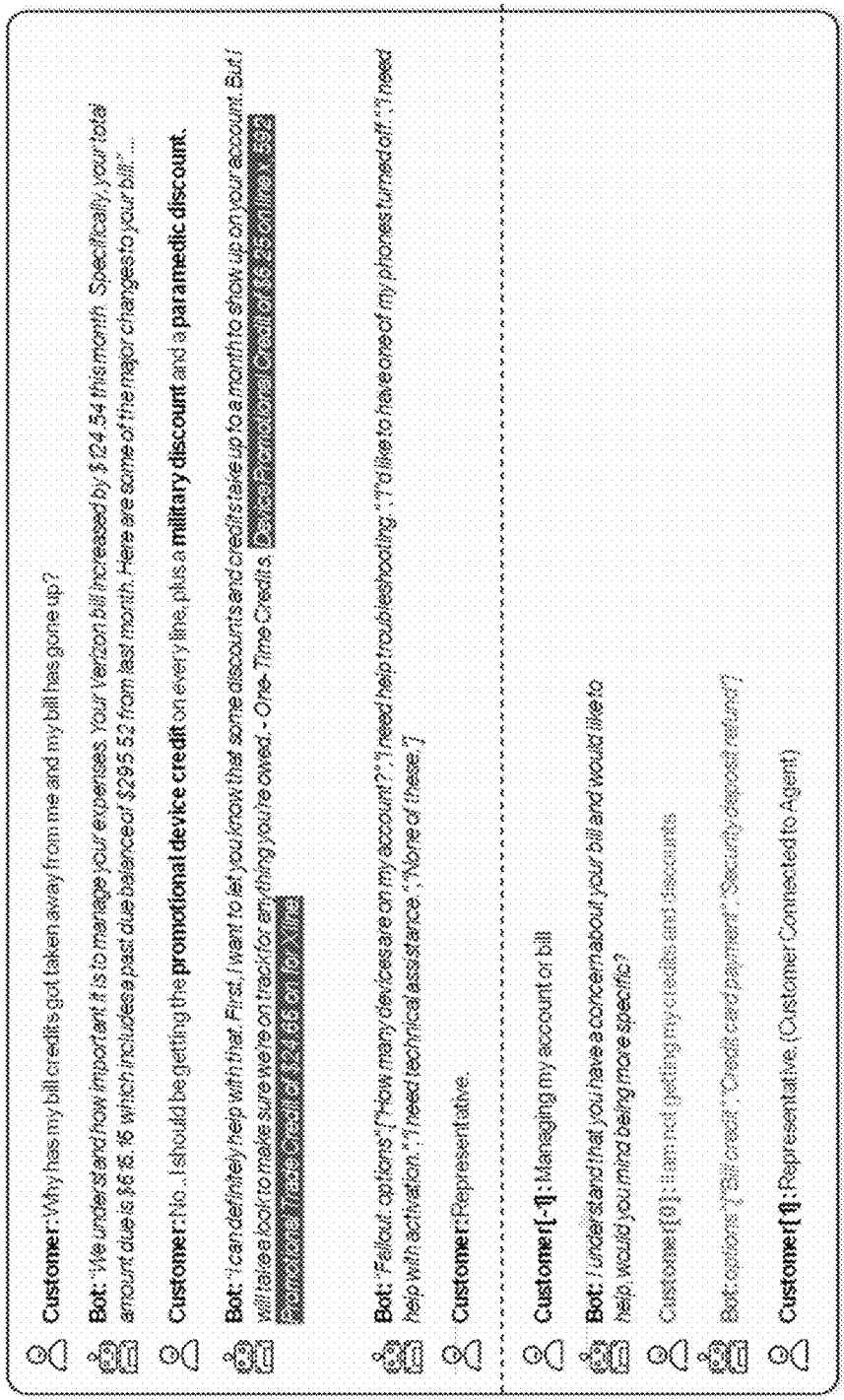

As shown in FIG. 1C, and by reference number 135, communication analysis device 105 may determine one or more portions of the session data. For example, after pre-processing the session data, communication analysis device 105 may analyze the session data to determine the one or more portions of the session data. A portion of the session data may include one or more of the entries. In other words, a portion of the session data may include a subset of messages exchanged between user device 110 and the chatbot, the subset being selected as part of the portion based on a specified criteria discussed further below.

In some implementations, communication analysis device 105 may analyze the session data to identify a period of time between a communication from user device 110 and a communication from the chatbot. If the period of time satisfies a first time threshold, communication analysis device 105 may determine that the period of time corresponds to a delimiter between a first portion of the session data and a second portion of the session data, as shown in FIG. 1C, for example.

Additionally, or alternatively, to analyzing the session data to identify the period of time, communication analysis device 105 may analyze the session data to identify escalation information regarding the escalation. In some implementations, communication analysis device 105 may identify a third portion of the session data as including an entry that includes the escalation information and one or more entries preceding the entry. Alternatively, communication analysis device 105 may identify the third portion of the session data as including the one or more entries preceding the entry (and excluding the entry).

In some examples, the escalation information may be included in a communication from user device 110 to AI communication device 115. For example, the escalation information may include a request to be connected to user device 120, such as "representative," "agent," "please connect me to a representative," "please connect me to an agent," among other examples. Additionally, or alternatively, the escalation information may include a request to modify services to which the customer subscribes, such as a request to terminate one or more of the services.

Additionally, or alternatively, to the escalation information being included in a communication from user device 110, the escalation information may be included in a communication from AI communication device 115 to user device 110. For example, the escalation information may include a suggestion indicating that user device 110 is to be connected to user device 120, such as "Let me connect you to a representative," "May I connect you to a representative," among other examples. Additionally, or alternatively, the escalation information may include information indicating that user device 110 has been connected to user device 120. Additionally, or alternatively, the escalation information may include information generated by AI communication device 115 as a result of a processing error by AI communication device 115. The information may be provided to a backend system associated with AI communication device 115 (and not provided to user device 110) and may cause user device 110 to be connected to user device 120.

Additionally, or alternatively, to analyzing the session data to identify the escalation information, communication analysis device 105 may analyze the session data to identify an indication of a graphical user interface being provided to user device 110 after an amount of time threshold following initiation of the communication session. In some implementations, communication analysis device 105 may identify a fourth portion of the session data as including an entry that includes the indication and one or more entries preceding the entry. Alternatively, communication analysis device 105 may identify the fourth portion of the session data as including the one or more entries preceding the entry (and excluding the entry).

Additionally, or alternatively, to analyzing the session data to identify the indication of the graphical user interface, communication analysis device 105 may analyze the session data to identify an indication of user device 110 suspending the communication session by navigating away from the chatbot (e.g., navigating away from a website associated with the chatbot) and resuming the communication session by returning to the website to resume communication with the chatbot. In some implementations, communication analysis device 105 may identify a fifth portion of the session data as including an entry that includes the indication and one or more entries preceding the entry. Alternatively, communication analysis device 105 may identify the fifth portion of the session data as including the one or more entries preceding the entry (and excluding the entry).

Figure 1D:
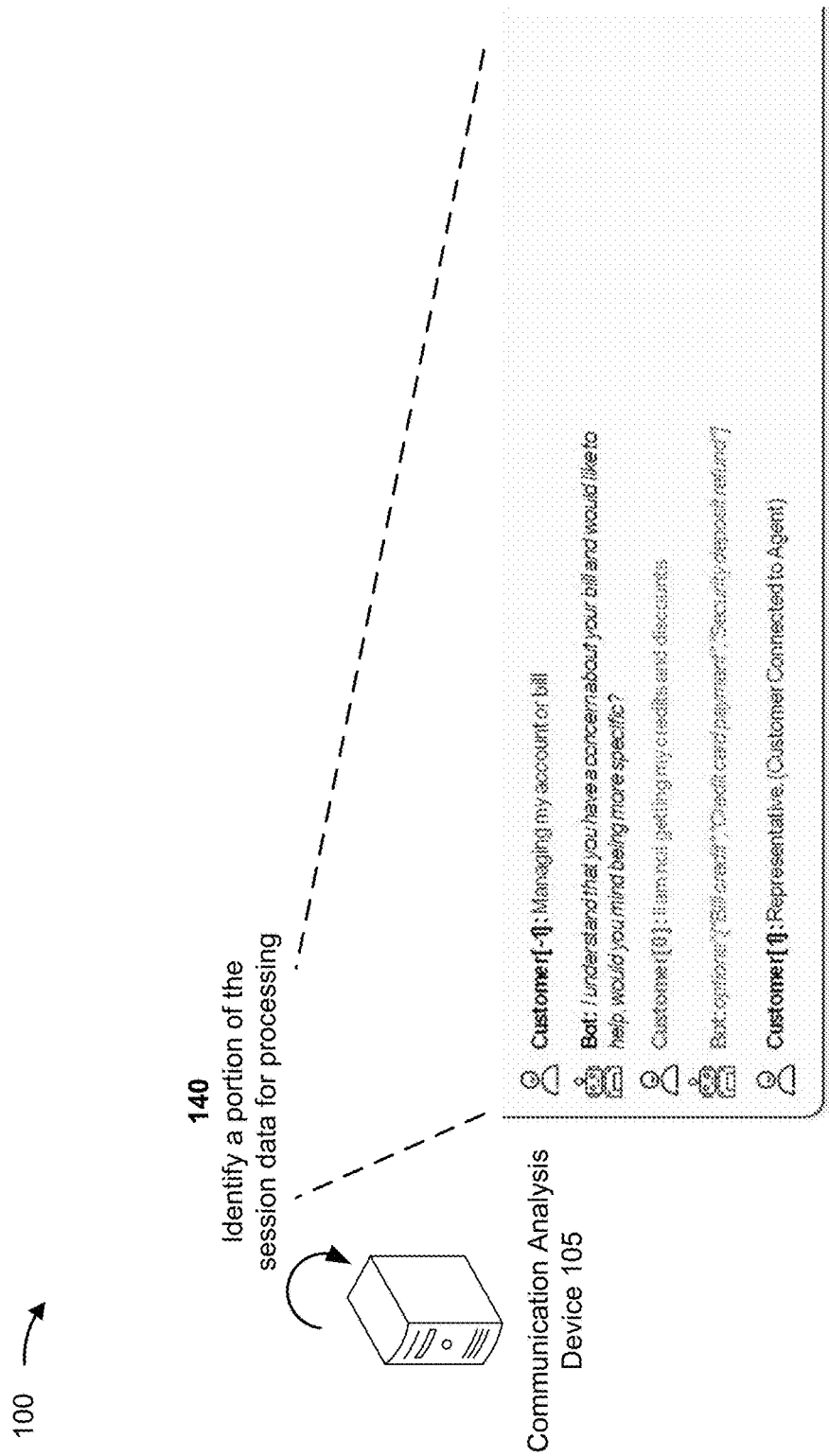

As shown in FIG. 1D, and by reference number 140, communication analysis device 105 may identify a portion of the session data for processing. For example, after identifying the one or more portions of the session data, communication analysis device 105 may analyze the one or more portions to identify the portion of the session data to be processed to determine the cause of the escalation. In some implementations, communication analysis device 105 may identify the portion of the session data based on a topic. As an example, communication analysis device 105 may receive information identifying the topic and may analyze the one or more portions of the session data to determine whether the topic is associated with the one or more portions of data. In some situations, the information identifying the topic may be included in the escalation analysis request.

In some situations, communication analysis device 105 may process the one or more portions of the session data to determine one or more topics associated with the one or more portions of the session data. For example, communication analysis device 105 may analyze the one or more portions of the session data using one or more NLP techniques to determine one or more topics. For instance, communication analysis device 105 may analyze the first portion of the session data (using the one or more NLP techniques) to determine a first topic associated with the first portion, analyze the second portion of the session data (using the one or more NLP techniques) to determine a second topic associated with the second portion, and so on.

Based on processing the one or more portions of the session to determine the one or more topics, communication analysis device 105 may determine that the first topic is the topic of billing, that the second topic is the topic of billing, that a third topic (associated with a third portion of the session data) is the topic of subscription plans, that a fourth topic (associated with a second portion of the session data) is the topic of data storage (e.g., cloud storage), and so on.

Communication analysis device 105 may compare the topic (identified in the escalation analysis request) and the one or more topics associated with the one or more portions of the session data. Based on the comparison, communication analysis device 105 may identify a portion of the session data (of the one or more portions) associated with a topic that corresponds to or substantially matches the topic identified in the escalation analysis request.

In some situations, communication analysis device 105 may identify one portion of the session data that is associated with a subtopic of the topic (identified in the escalation analysis request) and another portion of the session data that is associated with the topic. In such an instance, communication analysis device 105 may identify the one portion as the portion of the session data for processing. In other words, communication analysis device 105 may prioritize the one portion over one or more other portions based on the one portion being associated with the subtopic. For example, communication analysis device 105 may determine that the one portion is associated with a priority that is higher than a priority associated with the one or more other portions.

In some situations, communication analysis device 105 may identify two or more portions of the session data that are associated with the topic identified in the escalation analysis request. The two or more portions of the session data may be ordered chronologically. In such a situation, communication analysis device 105 may identify a particular portion (of the two or more portions) that is first (chronologically) as the portion of the session data for processing. In other words, communication analysis device 105 may prioritize the particular portion over one or more other portions of the two or more portions of the session data, in a manner similar to the manner described above.

Additionally, or alternatively, identifying the portion of the session data based on a topic, communication analysis device 105 may identify the portion of the session data based on the portion including the escalation information. For example, communication analysis device 105 may analyze the one or more portions of the session data to identify a portion that includes the escalation information. As explained above, the escalation information may include a first type of escalation information indicating that user device 110 has been connected to user device 120, a second type of escalation information including a request (from user device 110) to be connected to user device 120, and a third type of escalation information including a suggestion (from the chatbot) indicating that user device 110 is to be connected to user device 120.

In some implementations, communication analysis device 105 may identify the portion of the session data based on a priority associated with a type of escalation information included the portion. As an example, the first type of escalation information may be associated with a priority that exceeds priorities associated with the second type of escalation information and the third type of escalation information. The second type may be associated with a priority that exceeds a priority associated with the third type. For instance, communication analysis device 105 may identify a portion of the session data that includes the first type over another portion of the session data that includes the second type or the third type.

As shown in FIG. 1D, communication analysis device 105 may identify the first portion of the session data as the portion for processing. In some examples, communication analysis device 105 may identify the first portion based on determining that the first portion includes the first type of escalation information and that the second portion includes the second type of escalation information. Additionally, or alternatively, communication analysis device 105 may identify the first portion based on determining that the first portion is associated with a subtopic of the topic of billing (identified in the escalation analysis request) and that the second portion is associated with the topic of billing.

Figure 1E:
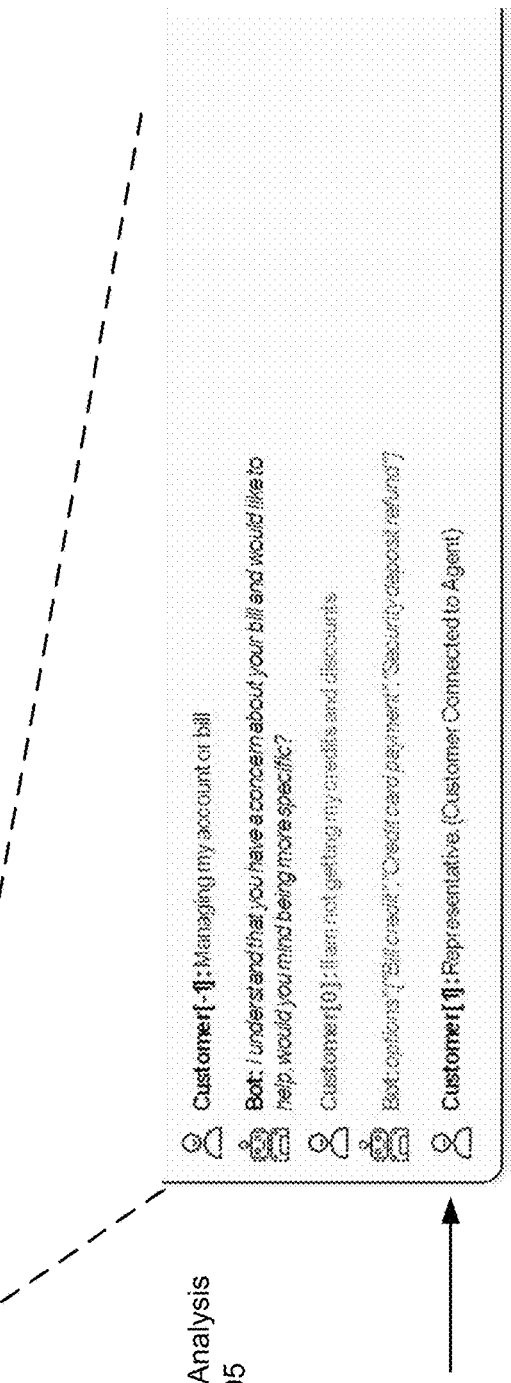

As shown in FIG. 1E, and by reference number 145, communication analysis device 105 may analyze the portion to identify an entry including information indicating an escalation. For example, after identifying the first portion of the session data for processing, communication analysis device 105 may analyze a plurality of entries (included in the first portion of the session data) to identify an entry that includes the escalation information. As shown in FIG. 1E, the first entry is an entry that includes the escalation information indicating that user device 110 has been connected to user device 120.

Figure 1F:
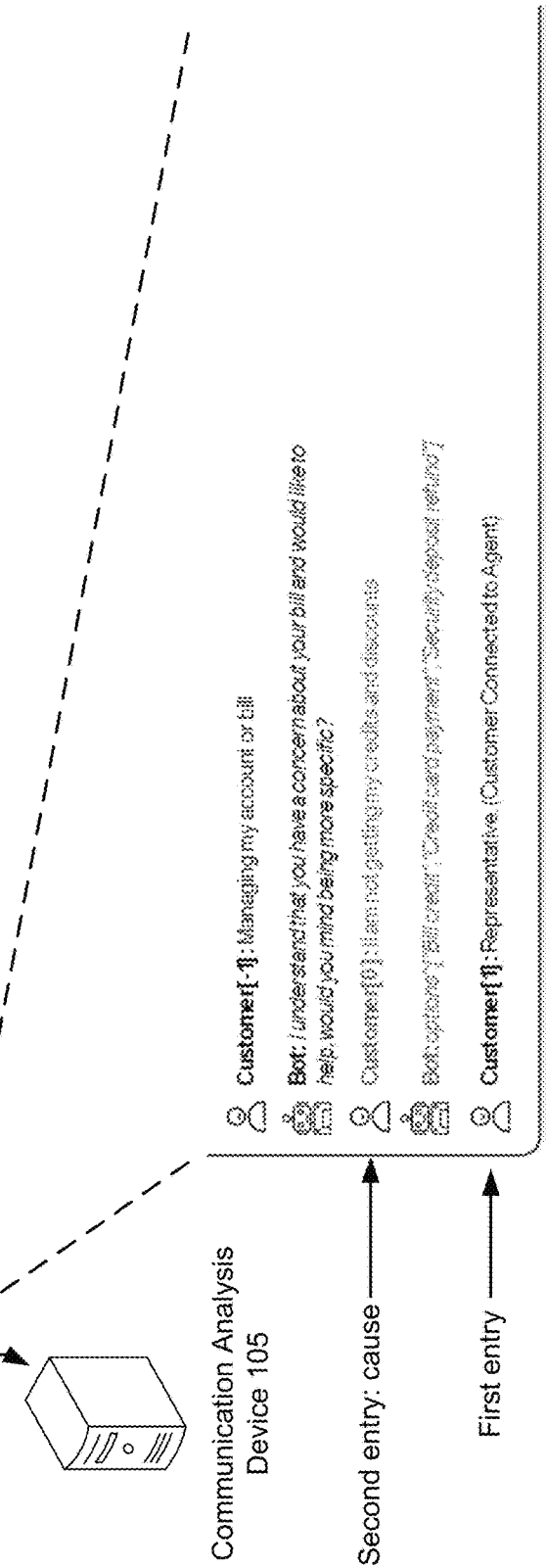

As shown in FIG. 1F, and by reference number 150, communication analysis device 105 may analyze one or more additional entries to determine the cause of the escalation. For example, after identifying the first entry, communication analysis device 105 may analyze the one or more additional entries included in the first portion of the session data to determine the cause of the escalation. The first entry and the one or more additional entries may be provided in a chronological order in the first portion of the session data. The one or more additional entries may immediately precede the first entry.

In some implementations, communication analysis device 105 may obtain the one or more rules from the rules data structure and may analyze the one or more additional entries to determine the cause of the escalation based on the one or more rules. The one or more rules may identify multiple factors for analyzing the one or more additional entries to determine the cause of the escalation. A first factor may indicate that communication analysis device 105 is to analyze the one or more additional entries in a reverse chronological order. Additionally, a second factor may indicate that communication analysis device 105 is to analyze entries that include a communication from user device 110 and a communication from AI communication device 115. Additionally, a third factor may indicate that an entry (of the one or more additional entries) that complies with the second factor and that is nearest to the first entry is the entry that includes the information regarding the cause of the escalation Based on the one or more rules, communication analysis device 105 may analyze the one or more additional entries in the reverse chronological order. When analyzing the one or more additional entries in a reverse chronological order, communication analysis device 105 may identify a next entry preceding the first entry in the first portion of the session data. In some implementations, prior to analyzing the next entry, communication analysis device 105 may determine whether the next entry includes a communication from user device 110 and a communication from the chatbot (e.g., whether the next entry includes a request message and a response message). If communication analysis device 105 determines that the next entry does not include a communication from user device 110 and a communication from the chatbot, communication analysis device 105 may identify a next preceding entry, of the one or more additional entries, until communication analysis device 105 identifies an entry that includes a communication from user device 110 and a communication from the chatbot.

If communication analysis device 105 determines that an entry includes a communication from user device 110 and a communication from the chatbot, communication analysis device 105 may analyze the entry to determine if the entry includes the information regarding the cause of the escalation. In some implementations, the information regarding the cause of the escalation may include a request message including information associated with the topic and a response message identifying a plurality of possible responses to the request message.

In other words, the information regarding the cause of the escalation may include information indicating that the chatbot was unable to provide a definitive response that addressed the request message (e.g., the chatbot was unable to provide a response that was satisfactory to the customer). In this regard, the cause of the escalation may be the chatbot being unable to provide a definitive response that addressed the request message, which may have caused user device 110 to provide a request to be connected to user device 120 and/or may have caused AI communication device 115 to provide a suggestion that user device 110 is to be connected to user device 120.

As shown in FIG. 1F, for example, a second entry (of the first portion of the session data) includes a request message indicating that credits and discounts have not been provided to the customer (in other words, credits and discounts are not available to the customer). As a response, the chatbot provides multiple possible responses to address the request message. In this regard, communication analysis device 105 may determine that the cause of the escalation is the chatbot being unable to provide a definitive response to address the fact that the credits and discounts are not available, which led user device 110 to provide a request to be connected to user device 120. Accordingly, the second entry includes the information regarding the cause of the escalation. The second entry may be referred to as an escalation entry (or escalation row).

In some situations, communication analysis device 105 may determine a category associated with the cause of the escalation. For example, communication analysis device 105 may determine the category based on the information included in the request message (e.g., information associated with the topic and/or information associated with a subtopic of the topic). As shown in FIG. 1F, for example, the request message includes information indicating that credits and discounts are unavailable, which is a subtopic of the topic of billing. Accordingly, communication analysis device 105 may determine that the category is unavailability of credits and/or discounts. In some examples, the information regarding the cause may include information identifying the category.

In some implementations, communication analysis device 105 may determine the cause of the escalation and/or the category using a model, such as a rule based model and/or a category machine learning model that is trained to determine causes of escalations and/or categories associated with escalations. The category machine learning model may be trained as described in more detail below in connection with FIG. 2. In some examples, communication analysis device 105 may train the category machine learning model. Additionally, or alternatively, a different device may generate and train the category machine learning model.

The category machine learning model may be trained based on historical data that includes historical session data, historical data regarding rules, historical data regarding topics, historical data regarding subtopics, among other examples. As an example, communication analysis device 105 may provide (as an input to the first machine learning model) the session data, the information identifying the topic, and/or the one or more rules. The category machine learning model may provide, as an output, the information regarding the cause of the escalation and/or information identifying the category associated with the cause.

As shown in FIG. 1G, and by reference number 155, communication analysis device 105 may provide, to one or more devices, information regarding the one or more additional entries and the information regarding the cause of the escalation for training of the chatbot. In some implementations, communication analysis device 105 may modify the session data to include the information regarding the one or more additional entries and the information regarding the cause (e.g., the information identifying the category) and provide the session data to the one or more devices. The one or more devices may include AI communication device 115, user device 120, and/or the device of the customer representative center.

As shown in FIG. 1G, the session data may include a data structure that includes multiple entries (e.g., rows). The information included in the session data may be similar to the information included in the session data described above in connection with FIG. 1B. Additionally, an entry may include information indicating whether the entry is an escalation entry. Additionally, or alternatively, the entry may include information identifying a position of the entry with respect to the escalation entry. For example, the escalation entry may be associated with position 0, a next entry preceding the escalation entry may be associated with position −1, a next preceding entry may be associated with position −2, a next entry following the escalation entry may be associated with position 1, and so on.

In some implementations, the information identifying the position of the entry may be provided to enable the one or more devices to identify messages from user device 110 prior to the cause of the escalation and/or messages from user device 110 following the cause of the escalation. Accordingly, the one or more devices may be provided insight with respect to the escalation and with respect to the cause of the escalation. Additionally, or alternatively, to including the information identifying the position, the entry may include the information identifying the category.

In some implementations, communication analysis device 105 may provide the session data to the one or more devices to cause the one or more devices to generate a graphical representation of the session data (e.g., a visualization of the session data). The one or more devices may provide the graphical representation of the session data to a user to enable the user to analyze the category and determine a response to the request message that caused the escalation. The response may be used to train the chatbot to address the cause of the escalation and prevent future escalations associated with the identified cause during a subsequent communication session involving the chatbot and/or another chatbot.

In some implementations, communication analysis device 105 may determine and recommend the response using a model, e.g. a recommendation machine learning model that is trained to determine responses to request messages that caused escalations. The recommendation machine learning model may be trained as described in more detail below in connection with FIG. 2. In some examples, communication analysis device 105 may train the recommendation machine learning model. Additionally, or alternatively, a different device may generate and train the recommendation machine learning model. In some situations, the category machine learning model and the recommendation machine learning model may be a same machine learning model.

The second machine learning model may be trained based on historical data that includes historical session data, historical data regarding rules, historical data regarding topics, historical data regarding subtopics, historical causes of escalation, historical categories associated with the historical causes, historical request messages, historical responses that did not trigger the escalations, among other examples. As an example, communication analysis device 105 may provide (as an input to the second machine learning model) the session data, the information identifying the topic, the one or more rules, information identifying the escalation entry, the information regarding the cause, and/or the information identifying the category. The second machine learning model may provide, as an output, a response that addresses the cause of the escalation.

Communication analysis device 105 may provide the response to AI communication device 115. The response may be used to train the chatbot to address the cause of the escalation and prevent another escalation, associated with the cause, during a subsequent communication session involving the chatbot and/or another chatbot.

Determining the information regarding the cause of the escalation and providing the information regarding the second entry and the information regarding the cause may preserve computing resources, storage resources, and/or network resources that would have been used to manually process the information regarding the communication session to determine the cause of the escalation. Additionally, determining the information regarding the cause and providing the information regarding the second entry and the information regarding the cause may preserve computing resources, storage resources, network resources that would have been used to take remedial actions with respect to errors in results of manually processing the information regarding the communication session.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
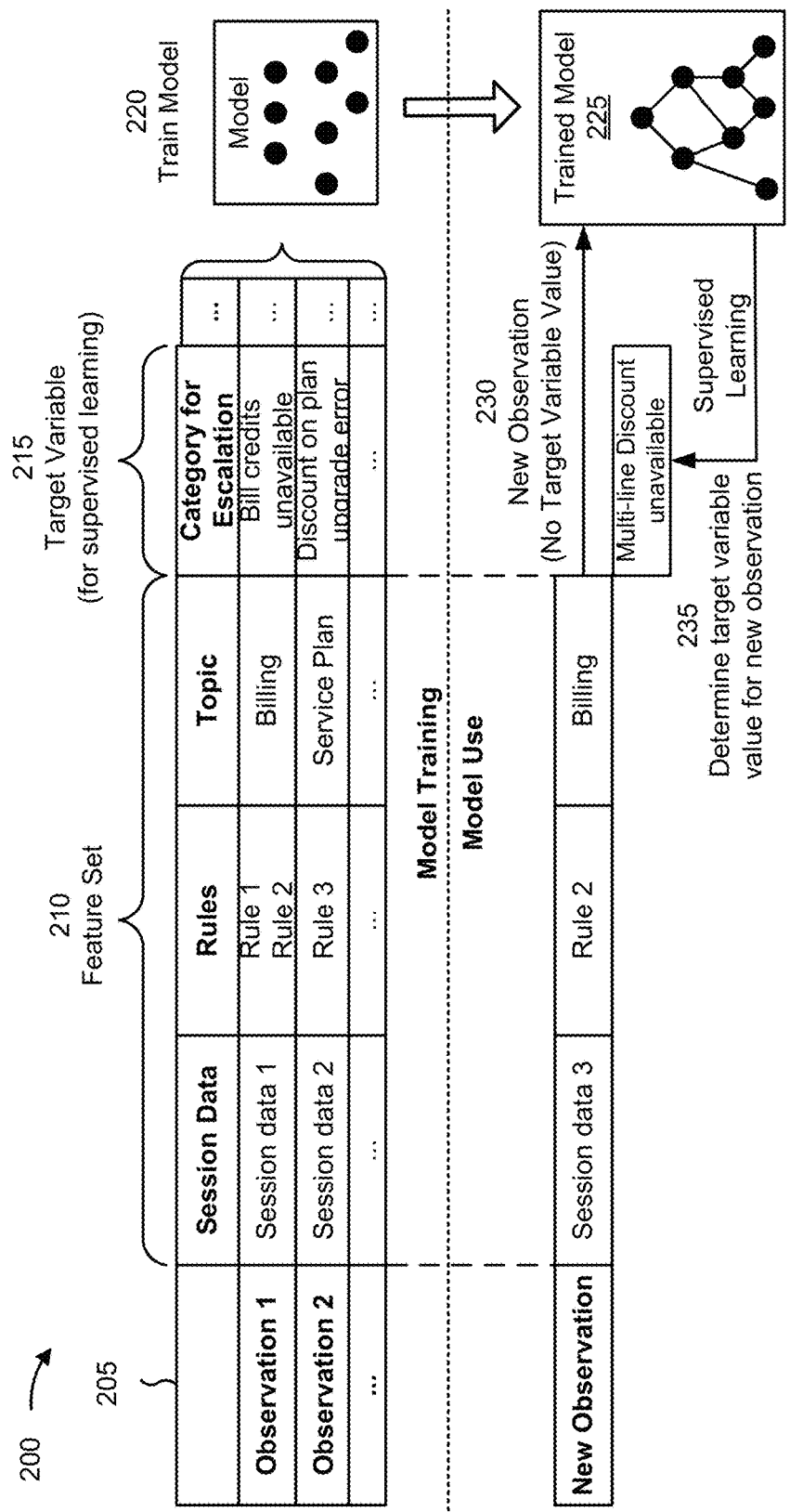
FIG. 2 is a diagram illustrating an example of training and using a machine learning model in connection with analyzing session data, of chatbot communication sessions, to reduce escalation.

FIG. 2 is a diagram illustrating an example 200 of training and using a machine learning model in connection with analyzing session data, of chatbot communication sessions, to reduce escalation. The machine learning model training and usage described herein may be performed using a machine learning system. The machine learning system may include or may be included in a computing device, a server, a cloud computing environment, or the like, such as communication analysis device 105 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from communication analysis device 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from communication analysis device 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of Session Data, a second feature of Rules, a third feature of Topic, and so on. As shown, for a first observation, the first feature may have a value of Session data 1, the second feature may have a value of Rule 1 and Rule 2, the third feature may have a value of Billing, and so on. These features and feature values are provided as examples, and may differ in other examples. For example, the feature set may include one or more of the following features: Category for Escalation, Cause of Escalation, Request Message, Response Message, Conversation Name (topic), Page Information (subtopic), NLP version, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is Category for Escalation, which has a value of Bill Credits for the first observation.

The feature set and target variable described above are provided as examples, and other examples may differ from what is described above. For example, for a target variable of Definitive Response, the feature set may include Session Data, Rules, Topic, Category for Escalation, and/or Cause of Escalation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of Session data 3, a second feature of Rule 2, a third feature of Billing, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of Multi-line Discount unavailable for the target variable of Category for Escalation for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, determining that the category for escalation is multi-line discount. The first automated action may include, for example, providing information identifying the category as multi-line discount.

As another example, if the machine learning system were to predict a value of provide discounts and/or credits for the target variable of Definitive Response, then the machine learning system may provide a second (e.g., different) recommendation (e.g., offer discounts and/or credits) and/or may perform or cause performance of a second (e.g., different) automated action (e.g., provide a response message indicating: "we can offer a discount as a courtesy to you as a loyal customer.").

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to analyzing session data, of chatbot communication sessions, to reduce escalation. The machine learning system enables recognition and/or identification of tens, hundreds, thousands, or millions of features and/or feature values for tens, hundreds, thousands, or millions of observations, thereby increasing accuracy and consistency and reducing delay associated with analyzing session data, of chatbot communication sessions, to reduce escalation relative to requiring computing resources to be allocated for tens, hundreds, or thousands of operators to manually analyzing session data, of chatbot communication sessions, to reduce escalation using the features or feature values.

As indicated above, FIG. 2 is provided as an example. Other examples may differ from what is described in connection with FIG. 2.

Figure 3:
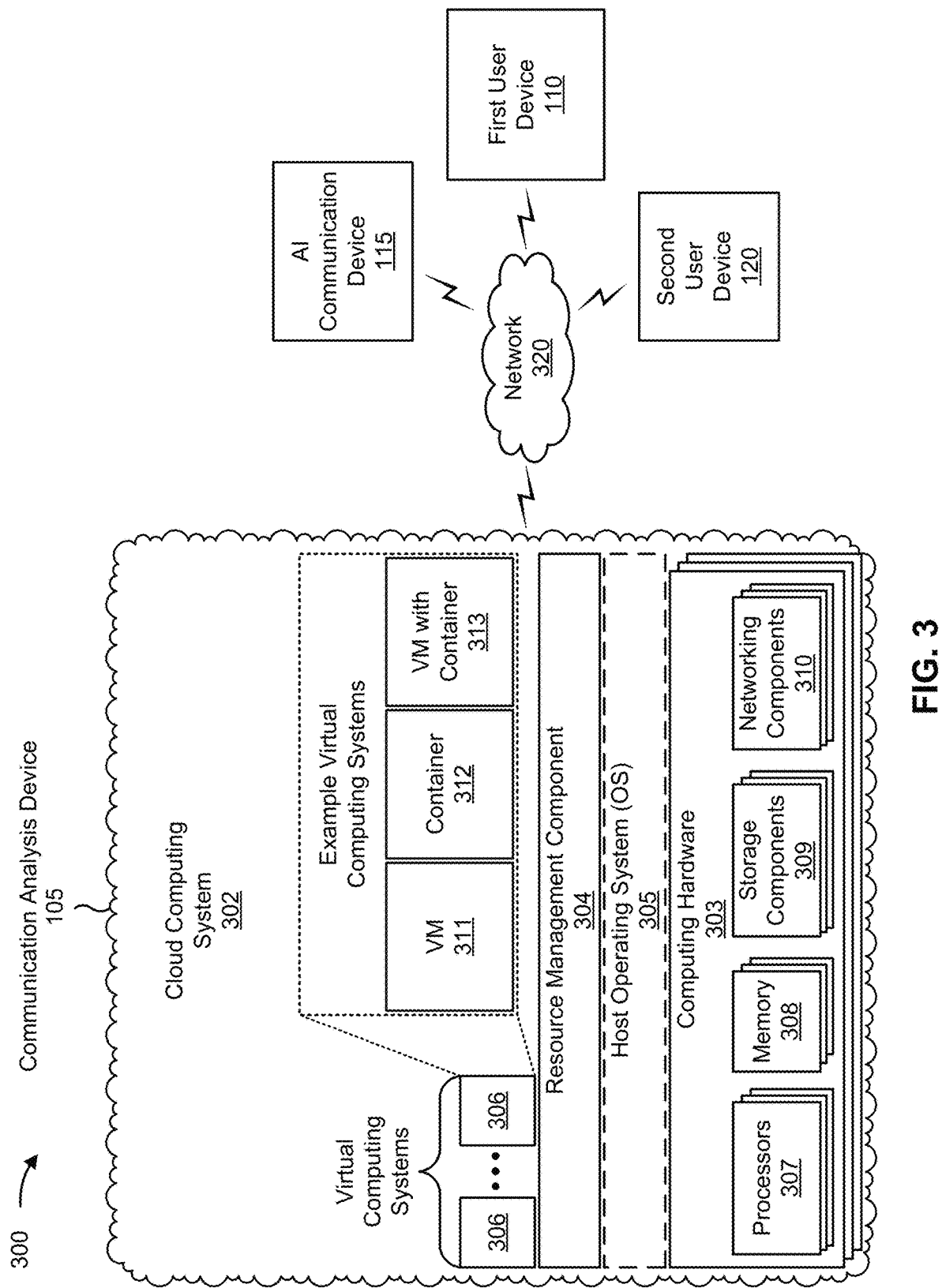
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a communication analysis device 105, which may include one or more elements of and/or may execute within a cloud computing system 302. The cloud computing system 302 may include one or more elements 303-313, as described in more detail below. As further shown in FIG. 3, environment 300 may include a network 320, user device 110, AI communication device 115, and/or user device 120. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the communication analysis device 105 may include one or more elements 303-313 of the cloud computing system 302, may execute within the cloud computing system 302, and/or may be hosted within the cloud computing system 302, in some implementations, the communication analysis device 105 may not be cloud-based (e.g., may be implemented outside of a cloud computing system) or may be partially cloud-based. For example, the communication analysis device 105 may include one or more devices that are not part of the cloud computing system 302, such as device 400 of FIG. 4, which may include a standalone server or another type of computing device. The communication analysis device 105 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

User device 110 may include a communication device and a computing device. For example, user device 110 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. User device 120 may be a device similar to user device 110.

AI communication device 115 may include a communication device and a computing device. For example, AI communication device 115 may include a server, such as an application server, a client server, a web server, a database server, a host server, a proxy server, a virtual server (e.g., executing on computing hardware), or a server in a cloud computing system. In some implementations, AI communication device 115 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
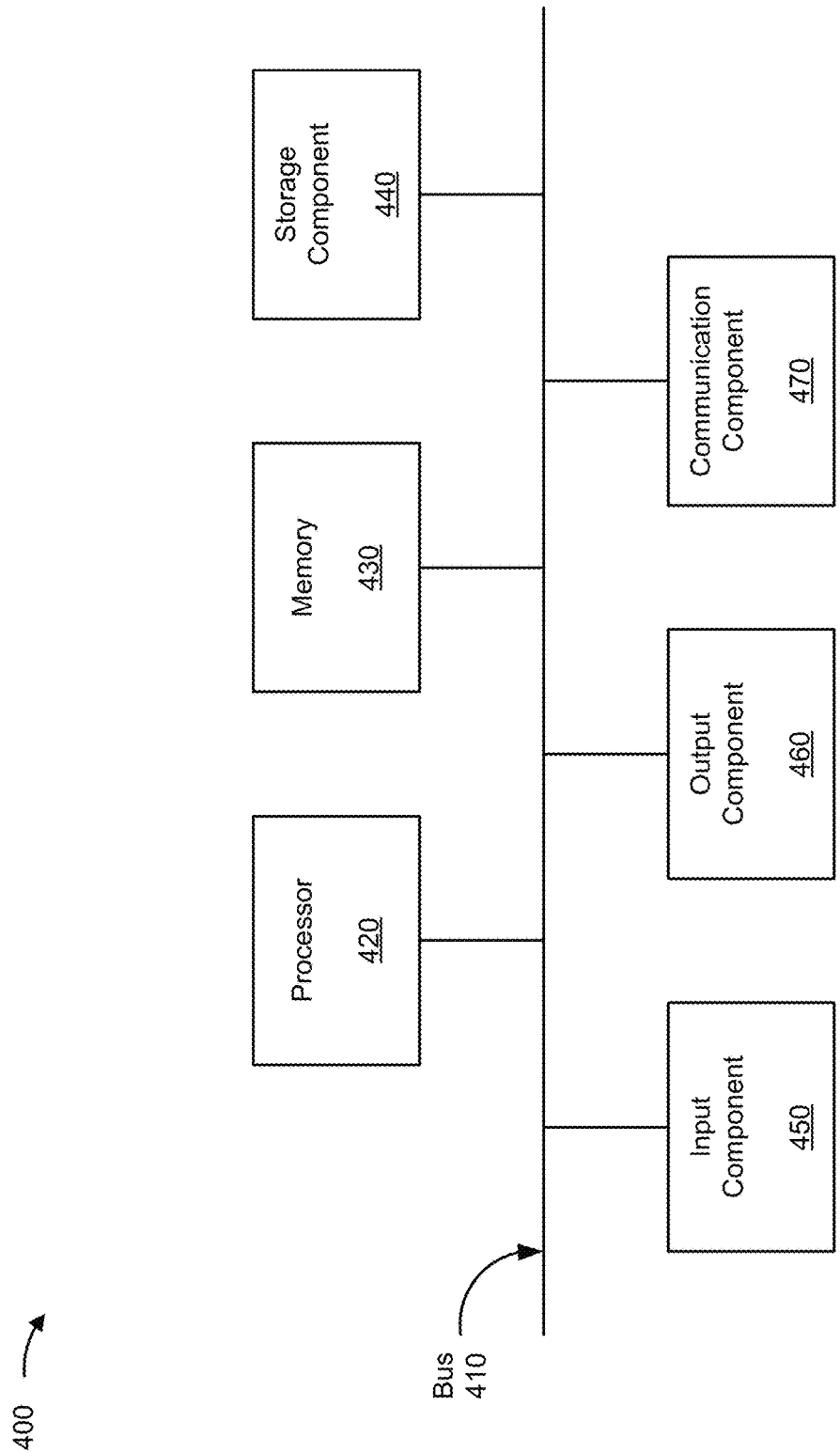
FIG. 4 is a diagram of example components of one or more devices of FIG. 3.

FIG. 4 is a diagram of example components of a device 400, which may correspond to communication analysis device 105, user device 110, AI communication device 115, and/or user device 120. In some implementations, communication analysis device 105, user device 110, AI communication device 115, and/or user device 120 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
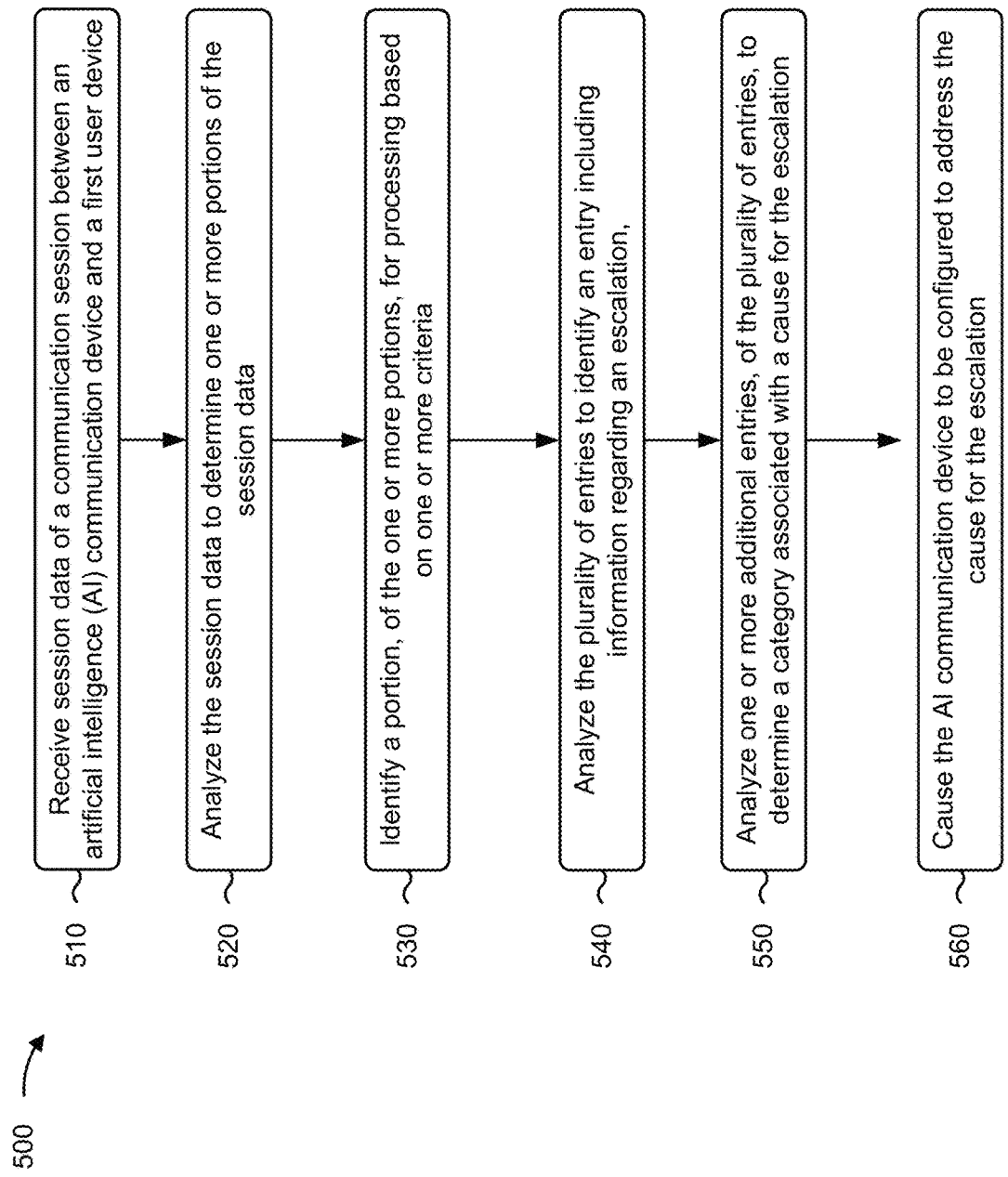
FIG. 5 is a flowchart of an example process relating to analyzing session data, of chatbot communication sessions, to reduce escalation.

FIG. 5 is a flowchart of an example process 500 associated with systems and methods for analyzing chatbot. In some implementations, one or more process blocks of FIG. 5 may be performed by a communication analysis device (e.g., communication analysis device 105). In some implementations, one or more process blocks of FIG. 5 may be performed by another device or a group of devices separate from or including the communication analysis device, such as a user device (e.g., user device 110), a user device 120 (e.g., user device 120), and/or a AI communication device (e.g., AI communication device 115). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving session data of a communication session between an AI communication device and a first user device (block 510). For example, the communication analysis device 105 may receive session data of a communication session between an AI communication device and a first user device, as described above.

In some implementations, the AI communication device executes a chatbot, wherein receiving the session data comprises receiving messages exchanged between the chatbot and the first user device, wherein the plurality of entries includes a subset of messages of the messages exchanged between the chatbot and the first user device.

As further shown in FIG. 5, process 500 may include analyzing the session data to determine one or more portions of the session data (block 520). For example, the communication analysis device 105 may analyze the session data to determine one or more portions of the session data, as described above.

In some implementations, analyzing the session data comprises analyzing the session data to identify at least one of a period of time between a communication from the first user device and a communication from the AI communication device, a request to communicate with the second user device, or an indication of a graphical user interface being provided to the first user device after a threshold amount of time following initiation of the communication session.

As further shown in FIG. 5, process 500 may include identifying a portion, of the one or more portions, for processing based on one or more criteria, wherein the portion includes a plurality of entries including communications from the first user device and communications from the AI communication device (block 530). For example, the communication analysis device 105 may identify a portion, of the one or more portions, for processing based on a topic associated with the portion, wherein the portion includes a plurality of entries including communications from the first user device and communications from the AI communication device, as described above.

In some implementations, the portion is a first portion and the topic is a first topic, wherein identifying the portion for processing comprises determining that the first topic is a subtopic of a second topic associated with a second portion of the one or more portions, and identifying the portion for processing based on determining that the first topic is a subtopic of the second topic.

In some implementations, identifying the portion for processing comprises identifying the portion based on the portion including information indicating that the first user device has been connected to the second user device, information indicating that the first user device has provided a request to be connected to the second user device, or information indicating that the AI communication device has provided a suggestion, to the first user device, indicating that the first user device is to be connected to the second user device.

As further shown in FIG. 5, process 500 may include analyzing the plurality of entries to identify an entry including information regarding an escalation, wherein the escalation indicates that the first user device has been connected to a second user device (block 540). For example, the communication analysis device 105 may analyze the plurality of entries to identify an entry including information regarding an escalation, wherein the escalation indicates that the first user device has been connected to a second user device, as described above.

In some implementations, the AI communication device includes a chatbot, wherein receiving the session data comprises receiving messages exchanged between the chatbot and the first user device, wherein the plurality of entries includes a subset of messages of the messages exchanged between the chatbot and the first user device, and wherein analyzing the plurality of entries comprises analyzing the subset of messages to identify a message including the information indicating the escalation.

As further shown in FIG. 5, process 500 may include analyzing one or more additional entries, of the plurality of entries, to determine a category associated with a cause of the escalation (block 550). For example, the communication analysis device 105 may analyze one or more additional entries, of the plurality of entries, to determine a category associated with a cause of the escalation, as described above.

In some implementations, the entry and the one or more additional entries are provided in a chronological order in the session data, wherein the one or more additional entries are provided prior to the entry, and wherein analyzing the one or more additional entries includes analyzing the one or more additional entries in a reverse chronological order to determine the category associated with the cause of the escalation.

In some implementations, analyzing the one or more additional entries in the reverse chronological order includes identifying a next entry, preceding the entry, that includes a request from the first user device and a response from the AI communication device, wherein the request includes information associated with the topic, and wherein the response includes information indicating that the AI communication device has identified a plurality of possible responses to the request, and determining the category based on the information associated with the topic.

As further shown in FIG. 5, process 500 may include causing the AI communication device to be configured to address the cause of the escalation (block 560). For example, the communication analysis device 105 may provide, to one or more devices, information regarding the one or more additional entries and information identifying the category to cause the AI communication device to be configured to address the cause of the escalation, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, the method comprising:
   receiving session data of a communication session between an artificial intelligence (AI) communication device and a first user device;
   analyzing the session data to determine one or more portions of the session data;
   identifying a portion, of the one or more portions, for processing based on one or more criteria associated with the portion, wherein the portion includes a plurality of entries including communications from the first user device and communications from the AI communication device;
   analyzing the plurality of entries to identify an entry including information regarding an escalation, wherein the escalation indicates that the first user device has been connected to a second user device;
   analyzing one or more additional entries of the plurality of entries, in a reverse chronological order, to determine a category associated with a cause of the escalation,
   wherein analyzing the one or more additional entries comprises: analyzing a first next entry. preceding the entry, when the first next entry
   includes a first communication from the first user device and a second communication from the Al communication device and
   identifying a second next entry, preceding the first next entry, when the first next entry does not include the first communication and the second communication; and
   causing the AI communication device to be configured to address the cause of the escalation based on information regarding the one or more additional entries and information identifying the category.

2. The method of claim 1, wherein the AI communication device executes a chatbot,
   wherein receiving the session data comprises:
      receiving messages exchanged between the chatbot and the first user device,
   wherein the plurality of entries includes a subset of messages of the messages exchanged between the chatbot and the first user device, and
   wherein analyzing the plurality of entries comprises:
      analyzing the subset of messages to identify a message including the information indicating the escalation.

3. The method of claim 1, wherein the entry and the one or more additional entries are provided in a chronological order in the session data,
   wherein the one or more additional entries are provided prior to the entry, and
   wherein analyzing the one or more additional entries includes:
      analyzing the one or more additional entries in the reverse chronological order to determine the category associated with the cause of the escalation.

4. The method of claim 3, wherein the one or more criteria include a topic,
  wherein the first communication includes a request that includes information associated with the topic,
  wherein the second communication includes a response that includes information indicating that the AI communication device has identified a plurality of possible responses to the request, and
    wherein analyzing the one or more additional entries comprises determining the category based on the information associated with the topic.

5. The method of claim 1, wherein the portion is a first portion and the one or more criteria include a first topic,
  wherein identifying the portion for processing comprises:
    determining that the first topic is a subtopic of a second topic associated with a second portion of the one or more portions; and
    identifying the portion for processing based on determining that the first topic is a subtopic of the second topic.

6. The method of claim 1, wherein analyzing the session data comprises:
  analyzing the session data to identify at least one of:
    a period of time between a communication from the first user device and a communication from the AI communication device,
    a request to communicate with the second user device, or
    an indication of a graphical user interface being provided to the first user device after a threshold amount of time following initiation of the communication session.

7. The method of claim 1, wherein identifying the portion for processing comprises:
  identifying the portion based on the portion including:
    information indicating that the first user device has been connected to the second user device,
    information indicating that the first user device has provided a request to be connected to the second user device, or
    information indicating that the AI communication device has provided a suggestion, to the first user device, indicating that the first user device is to be connected to the second user device.

8. A device, comprising:
  one or more processors configured to:
    receive session data regarding a communication session that includes a plurality of messages exchanged between a chatbot and a first user device;
    identify a portion of the session data, of one or more portions of the session data, for processing based on one or more criteria associated with the portion of the session data,
      wherein the portion of the session data includes a plurality of entries including messages from the first user device and messages from the chatbot;
    analyze the plurality of entries to identify a particular entry including escalation information regarding an escalation, wherein the escalation information indicates that the first user device has been connected to a second user device;
    analyze one or more additional entries, in a reverse chronological order, to determine a cause of the escalation,
      wherein, to analyze the one or more additional entries, the one or more processors are to:
        analyze a first next entry, preceding the particular entry, when the first next entry includes a first message from the first user device and a second message from the chatbot, and
        identify a second next entry, preceding the first next entry, when the first next entry does not include the first message and the second message; and
    cause the chatbot to be trained to address the cause and prevent another escalation, associated with the cause, during a subsequent communication session involving the chatbot,
      wherein the chatbot is trained based on first information regarding the cause and second information regarding one of the first next entry of the second next entry of the one or more additional entries.

9. The device of claim 8, wherein the one or more processors, to receive the session data regarding the communication session, are configured to:
  receive a transcript of the communication session, and
  wherein, prior to identifying the portion of the session data, the one or more processors are further configured to:
    perform data processing on the transcript of the communication session to at least one of:
    remove one or more characters, or
    identify a beginning of the communication session and an ending of the communication session.

10. The device of claim 8, wherein the portion of the session data is a first portion of the session data, and
  wherein the one or more processors, to identify the portion of the session data, are configured to:
    analyze the first portion of the session data, using a natural language processing technique, to determine a first topic associated with the first portion of the session data;
    analyze a second portion of the session data, of the one or more portions of the session data, using the natural language processing technique, to determine a second topic associated with the second portion of the session data;
    determine a first priority associated with the first topic and a second priority associated with the second topic; and
    identify the first portion of the session data for processing based on determining the first priority and the second priority.

11. The device of claim 10, wherein the one or more processors, to identify the first portion of the session data, are configured to:
  determine that the first priority is higher than the second priority; and
  identify the first portion of the session data for processing based on determining that the first priority exceeds the second priority.

12. The device of claim 8, wherein the first-particular entry and the one or more additional entries are provided in a chronological order in the session data,
  wherein the one or more additional entries are provided prior to the particular entry,
  wherein the one or more processors, to analyze the one or more additional entries to determine the cause of the escalation, are configured to:
    analyze the one or more additional entries, in the reverse chronological order, to determine the cause of the escalation after identifying the particular entry.

13. The device of claim 8, wherein the one or more processors, to analyze the one or more additional entries, are configured to:

analyze the one of the first next entry of the second next entry based on determining that the one of the first next entry or the second next entry includes the first message from the first user device and the second message from the chatbot,
 wherein the chatbot is trained based on a machine learning model, used by the chatbot being trained to determine responses to request messages that caused escalations, and
 wherein the machine learning model is trained using historical data that includes the first message.

14. The device of claim 8, wherein the one or more criteria include at least one of a topic or a period of time;
 wherein the one or more processors are further configured to:
  receive information identifying the topic; and
 wherein the one or more processors, to identify the portion of the session data, are configured to:
  analyze the portion of the session data, using a natural language processing technique, to determine that the portion of the session data is associated with the topic.

15. A non-transitory computer-readable medium storing a set of instructions, the set of instructions comprising:
 one or more instructions that, when executed by one or more processors of a device, cause the device to:
  receive session data regarding a communication session that includes a plurality of messages exchanged between a chatbot and a first user device;
  identify a portion of the session data, of one or more portions of the session data, for processing based on one or more criteria associated with the portion of the session data,
   wherein the portion of the session data includes a plurality of entries including messages from the first user device and messages from the chatbot;
  analyze the plurality of entries to identify an entry including escalation information regarding an escalation,
   wherein the escalation indicates that the first user device has been connected to a second user device;
  analyze one or more additional entries, of the plurality of entries, to determine a cause of the escalation,
   wherein the one or more additional entries are analyzed in a reverse chronological order,
   wherein the one or more instructions to analyze the one or more additional entries comprise one or more instructions to:
    analyze a first next entry, preceding the entry, when the first next entry includes a first message from the first user device and a second message from the chatbot, and
    identify a second next entry. g the first next entry, whe the first next entry does not include the first message and the second message; and
  cause the chatbot to be trained to address the cause during a subsequent communication session involving the chatbot,
   wherein the chatbot is trained based on information identifying the one or more additional entries and information regarding the cause of the escalation.

16. The non-transitory computer-readable medium of claim 15, wherein the one or more instructions, that cause the device to analyze the one or more additional entries, cause the device to:
 determine that the first next entry does not include the first message and the second message; and
 analyze the second next entry based on determining that the second next entry includes the first message device and the second message.

17. The non-transitory computer-readable medium of claim 15, wherein the one or more instructions, that cause the device to analyze the one or more additional entries, cause the device to:
 obtain one or more rules associated with identifying information regarding causes of escalations; and
 analyze the one or more additional entries to determine the cause of the escalation based on the one or more rules.

18. The non-transitory computer-readable medium of claim 15, wherein the one or more instructions, when executed by the one or more processors, further cause the device to:
 analyze the session data to identify at least one of:
  a period of time between a communication from the first user device and a communication from the chatbot,
  a request to communicate with the second user device, or
  an indication of a graphical user interface being provided to the first user device after a threshold amount of time following initiation of the communication session; and
 identify the one or more portions of the session data based on analyzing the session data.

19. The non-transitory computer-readable medium of claim 15, wherein the one or more instructions, that cause the device to analyze the plurality of entries, cause the device to:
 identify the entry based on the entry including:
  information indicating that the first user device has been connected to the second user device,
  information indicating that the first user device has provided a request to be connected to the second user device, or
  information indicating that the chatbot has provided a suggestion, to the first user device, indicating that the first user device is to be connected to the second user device.

20. The non-transitory computer-readable medium of claim 15, wherein the one or more instructions, when executed by the one or more processors, further cause the device to:
 receive a transcript of the communication session, and
 perform data processing on the transcript of the communication session to at least one of:
  remove one or more words or one or more characters, or identify a beginning of the communication session and an ending of the communication session.

* * * * *